（12）United States Patent
Edwards et al.

(10) Patent No.: US 7,155,662 B1
(45) Date of Patent: Dec. 26, 2006

(54) REPRESENTING AN ENTITY AS A DOCUMENT USING A DATA SOURCE HAVING ACTIVE PROPERTIES

(75) Inventors: Warren Keith Edwards, San Francisco, CA (US); Anthony George LaMarca, Redwood City, CA (US)

(73) Assignee: Xerox Corporation, Stamford, CT (US)

( * ) Notice: Subject to any disclaimer, the term of this patent is extended or adjusted under 35 U.S.C. 154(b) by 703 days.

(21) Appl. No.: 09/607,676

(22) Filed: Jun. 30, 2000

Related U.S. Application Data

(63) Continuation-in-part of application No. 09/143,802, filed on Aug. 31, 1998, now Pat. No. 6,266,670, and a continuation-in-part of application No. 09/143,551, filed on Aug. 31, 1998, now Pat. No. 6,308,179, and a continuation-in-part of application No. 09/144,231, filed on Aug. 31, 1998, now Pat. No. 6,253,217, and a continuation-in-part of application No. 09/143,777, filed on Aug. 31, 1998, now Pat. No. 6,562,076, and a continuation-in-part of application No. 09/143,772, filed on Aug. 31, 1998, now Pat. No. 6,330,573, and a continuation-in-part of application No. 09/144,032, filed on Aug. 31, 1998, now Pat. No. 6,266,682, and a continuation-in-part of application No. 09/143,778, filed on Aug. 31, 1998, now Pat. No. 6,269,380, and a continuation-in-part of application No. 09/144,143, filed on Aug. 31, 1998, now Pat. No. 6,370,553, and a continuation-in-part of application No. 09/143,555, filed on Aug. 31, 1998, now Pat. No. 6,397,231, and a continuation-in-part of application No. 09/144,383, filed on Aug. 31, 1998, now Pat. No. 6,324,551, and a continuation-in-part of application No. 09/143,773, filed on Aug. 31, 1998, now Pat. No. 6,240,429.

(51) Int. Cl.
G06F 7/00 (2006.01)
(52) U.S. Cl. ...................................... 715/500; 715/515
(58) Field of Classification Search ................ 715/500, 715/513–515
See application file for complete search history.

(56) References Cited

U.S. PATENT DOCUMENTS

| 5,341,293 | A | * | 8/1994 | Vertelney et al. | ........... 715/530 |
| 5,760,775 | A | * | 6/1998 | Sklut et al. | ................. 345/839 |
| 5,801,701 | A | * | 9/1998 | Koppolu et al. | ............ 345/821 |
| 5,819,273 | A | * | 10/1998 | Vora et al. | .................... 707/10 |
| 5,872,569 | A | * | 2/1999 | Salgado et al. | ............. 345/764 |
| 5,901,286 | A | * | 5/1999 | Danknick et al. | ........... 709/203 |
| 6,216,113 | B1 | * | 4/2001 | Aikens et al. | ................ 705/34 |
| 6,233,224 | B1 | * | 5/2001 | Yamashita et al. | .......... 370/231 |
| 6,324,543 | B1 | * | 11/2001 | Cohen et al. | ............... 707/200 |
| 6,397,054 | B1 | * | 5/2002 | Hoirup et al. | ........... 455/404.1 |

OTHER PUBLICATIONS

"Getting Results With Microsoft Office 97", Microsoft, 1997, pp. 27-34.*

(Continued)

Primary Examiner—Cesar Paula
(74) Attorney, Agent, or Firm—Fliesler Meyer LLP

(57) ABSTRACT

A document management method and system for representing entities as documents. The entities include tasks, persons, devices such as phones, printers, cameras, computational processes, and workflow applications such as trip approval processes and hiring processes. Various data sources are used. A data source generally has an associated property and content information related to the entity. A bit provider is configured to identify the data source having the associated property, retrieve the content information, and provide the retrieved content information as at least a portion of the document. Application interfaces are configured to provide the document to various applications.

10 Claims, 11 Drawing Sheets

OTHER PUBLICATIONS

Adler, A., et al., "A Diary Study of Work-Related Reading: Design Implications for Digital Reading Devices," *Proceedings, ACM CHI Conference*, Apr. 18-23, 1998, pp. 241-248.

Bellotti, V. and Rogers, Y., "From Web Press to Web Pressure: Multimedia Representations and Multimedia Publishing," *Proceedings, ACM CHI Conference*, Mar. 22-27, 1997, pp. 279-286.

Curry, D., "Appendix C," *UNIX Systems Programming*, O'Reilly Associates, 1996, pp. 549-559.

Dourish, P., et al., "Extending Document Management Systems with User-Specific Active Properties," *ACM Transactions on Information Systems*, Apr. 2000, vol. 18, No. 2, pp. 140-170.

Gundavaram, S., "Chapter 1, The Common Gateway Interface (CGI)," *Programming on the World Wide Web*, O'Reilly Associates, 1996.

Kessler, B. et al., "Automatic Detection of Text Genre," *Proceedings ACL/EACL*, 1997.

LaMarca, A. et al., "Taking the Work out of Workflow: Mechanisms for Document-Centric Collaboration," *Proceedings of the European Conference on Computer-Supported Cooperative Work ECSCW'99* (Copenhagen, Denmark), Dordrecht: Kluwer Academic Publishers, Sep. 12, 1999.

Lamping, J., et al., "A Focus+Context Technique Based on Hyperbolic Geometry for Visualizing Large Hierarchies," *Proceedings, ACM CHI Conference*, 1995.

Rashid, R., et al., "Mach: A Foundation for Open Systems," *Proceedings, Second Workshop on Workstation Operating Systems (WWOS2)*, 1989.

Shardanand, U. and Maes, P., "Social Information Filtering: Algorithms for Automating Word of Mouth," *Proceedings, ACM CHI Conference*, 1995.

\* cited by examiner

REPRESENTING AN ENTITY AS A DOCUMENT USING A DATA SOURCE HAVING ACTIVE PROPERTIES

CROSS-REFERENCES TO RELATED APPLICATIONS

This application is a continuation-in-part of the following co-pending patent applications: U.S. Ser. No. 09/143,802, filed Aug. 31, 1998 now U.S. Pat. No. 6,266,670B1, Anthony G. LaMarca, et al., entitled USER LEVEL ACCESSING OF LOW-LEVEL COMPUTER SYSTEM OPERATIONS; U.S. Ser. No. 09/143,551, filed Aug. 31, 1998 now U.S. Pat. No. 6,308,179B1, Karin Petersen, et al., entitled PROPERTY-BASED USER LEVEL DOCUMENT MANAGEMENT; U.S. Ser. No. 09/143,778, filed Aug. 31, 1998 now U.S. Pat. No. 6,269,380B1, Douglas B. Terry, et al., entitled A PROPERTY-BASED MECHANISM FOR FLEXIBLY SUPPORTING FRONT-END AND BACK-END COMPONENTS HAVING DIFFERENT COMMUNICATION PROTOCOLS; U.S. Ser. No. 09/144,143, filed Aug. 31, 1998 now U.S. Pat. No. 6,370,553B1, Warren K. Edwards, et al., entitled ATOMIC AND MOLECULAR DOCUMENTS; U.S. Ser. No. 09/143,555, filed Aug. 31, 1998 now U.S. Pat. No. 6,397,231B1, Michael P. Salisbury, et al., entitled VIRTUAL DOCUMENTS; U.S. Ser. No. 09/144,383, filed Aug. 31, 1998 now U.S. Pat. No. 6,324,551B1, John O. Lamping, et al., entitled SELF CONTAINED DOCUMENT MANAGEMENT BASED ON DOCUMENT PROPERTIES; U.S. Ser. No. 09/143,773, filed Aug. 31, 1998 now U.S. Pat. No. 6,240,429B1, James D. Thornton, et al., entitled SERVICE INTERACTION USING PROPERTIES ATTACHED TO DOCUMENTS; U.S. Ser. No. 09/144,231, filed Aug. 31, 1998 now U.S. Pat. No. 6,253,217B1, James P. Dourish, et al., entitled ACTIVE PROPERTIES FOR DYNAMIC SYSTEM CONFIGURATION; U.S. Ser. No. 09/143,777, filed Aug. 31, 1998 now U.S. Pat. No. 6,562,076B2, Warren K. Edwards, et al., entitled EXTENDING APPLICATION BEHAVIOR THROUGH DOCUMENT PROPERTIES; U.S. Ser. No. 09/143,772, filed Aug. 31, 1998 now U.S. Pat. No. 6,330,573B1, Michael P. Salisbury, et al., entitled MAINTAINING DOCUMENT IDENTITY ACROSS FILE SYSTEM INTERFACES; and U.S. Ser. No. 09/144,032, filed Aug. 31, 1998 now U.S. Pat. No. 6,226,682B1, Anthony G. LaMarca, et al, entitled CLUSTERING RELATED FILES IN A DOCUMENT MANAGEMENT SYSTEM. These applications were filed Aug. 31, 1998, assigned to a common assignee, and are hereby incorporated by reference.

FIELD

The present invention relates generally to a method and system for defining a document using a document management system. More particularly, the present invention relates to representing an entity as a document using one or more data sources to define the document.

BACKGROUND

Much of contemporary computer use is characterized by the manipulation of electronic documents. Computer users regularly create, view, edit, mail, print, and file electronic documents. The prevalence of electronic documents on modem computers and networks mirrors the use of physical documents in the workaday world. This has resulted in the commonly used metaphors of document-centered computing—opening and closing, reading and writing, searching and printing—becoming part of the lingua franca of computing.

Applications are becoming increasingly sophisticated to support the many types of electronic documents and functions needed to manipulate these documents. Modem applications provide document management techniques such as indexing, hyperlinking, collaborative document filtering and recommendation, browsing of document collections, and automatic identification of document genres. The diversity of document management applications which support these techniques, such as e-mail programs, World Wide Web ("web") browsers, and file management applications, is indicative of the prevalence of electronic documents in the computer user's online work.

The presence of electronic documents on computer systems is indeed pervasive. A substantial portion of a computer user's work, however, is often not document-centric. For example, some computer users perform system administration functions such as managing printers or installing software. Other users control processes, such as database management. Still other users controls external devices like cameras or speakers connected to the computer. While these tasks may relate to the use, creation and management of documents, the tasks themselves are not directly represented as documents. Thus, the common metaphors of document-based computing do not apply, and the advantages associated with electronic documents cannot be achieved using conventional document processing and management systems. With these systems, the document metaphor has fallen short of providing a means for interacting with all forms of information.

One possible explanation for why many computational entities have not been represented as documents is that such entities often carry a great deal of domain-specific semantics. For example, there may semantics particular to a letter created using a word processing application, or a budget made with Microsoft® Excel®. Conventional general purpose software applications are an inappropriate medium for working with the functionality needed to encode these semantics. For example, the specialized functionality of a camera is generally not accessible with a tool like Microsoft® Word® or Microsoft® Excel®. Also, the many devices people ordinarily use in the course of computer work, such as FAX machines, scanners, televisions, VCRs, and telephones, are not designed to be integrated with existing computer applications.

To expose the functionality of various entities, conventional systems incorporate specialized applications. For example, a cellular telephone often includes a special-purpose application to provide for the editing of its internal phone book from a desktop computer. This application reflects the functionality supported by the phone and allows its content—the actual names and numbers in the phone book—to be imported or exported in some common formats. Other examples of these specialized applications are control software for devices (cameras, scanners, printers, etc.), corporate personnel directories, and on-line purchase request systems.

One problem associated with specialized applications, however, is that such applications are useful only for exposing the functionalities of the particular entities for which they are designed to communicate with. An application for editing the internal phone book of a cellular telephone is not very helpful in exposing the functionality of, for example, a video game. Another problem associated with specialized applications is that each time a user desires to manipulate a new computational entity, a new specialized application must be introduced. The user then has to spend time learning how to use the new application, costing time and energy on the part of the user.

General purpose tools are to be contrasted with the specialized applications described above. Applications such as word processors, spreadsheets, and web browsers typically impose few restrictions on the information they process. Domain semantics, if any, in the information manipulated are generally not reflected in the applications themselves. Thus, when a user receives a new word processing document, for example, he does not need to spend the time and energy worrying about how to use some new application, and/or how to understand the content of the document. He simply opens the document using a word processing application with which he is familiar, reads the document, and proceeds accordingly.

SUMMARY

Aspects of the present invention involve representing an entity as a document. A data source has an associated property and content information related to the entity. The data source having the associated property is identified, the content information from the identified data source is retrieved, and the retrieved content information is provided as at least a portion of the document.

Aspects of the present invention extend the reach of the document-centric model of computing to physical and virtual entities. The objects at the focus of this model are reified as documents, allowing the metaphors of document creation and manipulation to be applied to new tasks. By bringing these entities into the sphere of electronic documents, existing tools and general-purpose applications that understand and manipulate documents may be used to interact with the various entities.

The application of general-purpose tools to semantically-loaded content types can be useful, but there are potential pitfalls with the loss of the functionality provided by special-purpose applications. Aspects of the present invention provide a solution to this problem that strikes a balance between generality and specificity by allowing application functionality and user interface components to be associated with the document and used by general-purpose applications that operate on that document.

Aspects of the present invention allow a user to essentially "live" in a document-oriented world and use familiar tools such as editors, and computing techniques such as cut and paste or drag and drop, to interact with a much wider range of computational and physical entities than before. In essence, electronic documents become a metaphor for the interactive objects in both the virtual and the physical worlds, rather than simply a metaphor for physical documents.

Aspects of the present invention also provide a general framework for easily extending any type of entity into the realm of documents. Further, documents are more fully realized as "first-class" documents than files in conventional filesystems. That is, the documents provide for organizing, sharing, annotating and customizing, among other features. Documents used in accordance with aspects of the present invention are freely created, grouped, and renamed.

DETAILED DESCRIPTION

A document management system constructed according to the present invention is desirably situated as "middleware," that is, interposed between a layer of applications and a data storage layer, including a plurality of data sources.

The document management system is preferably implemented on one or more servers in a computer network, although various hardware and software configurations may be used as will be recognized by those skilled in the art. In one exemplary embodiment, each user of the system is provided with a separate "kernel," or software server, running on a hardware computer server coupled to the network. In an other exemplary embodiment, one kernel is provided that supports multiple users simultaneously. Yet another exemplary embodiment involves incorporating the functionality performed by the kernel into the operating system itself, as a "native" part of its functionality. Still another exemplary embodiment involves incorporating the functionality into a different software, hardware, or combination software/hardware server, such as a web server, file server, or database server.

Software used to implement part or all of the document management system, depending on the particular embodiment, is preferably encoded in Java. This includes the various properties used to support particular document types.

Document Management System Architecture

Figure 1:
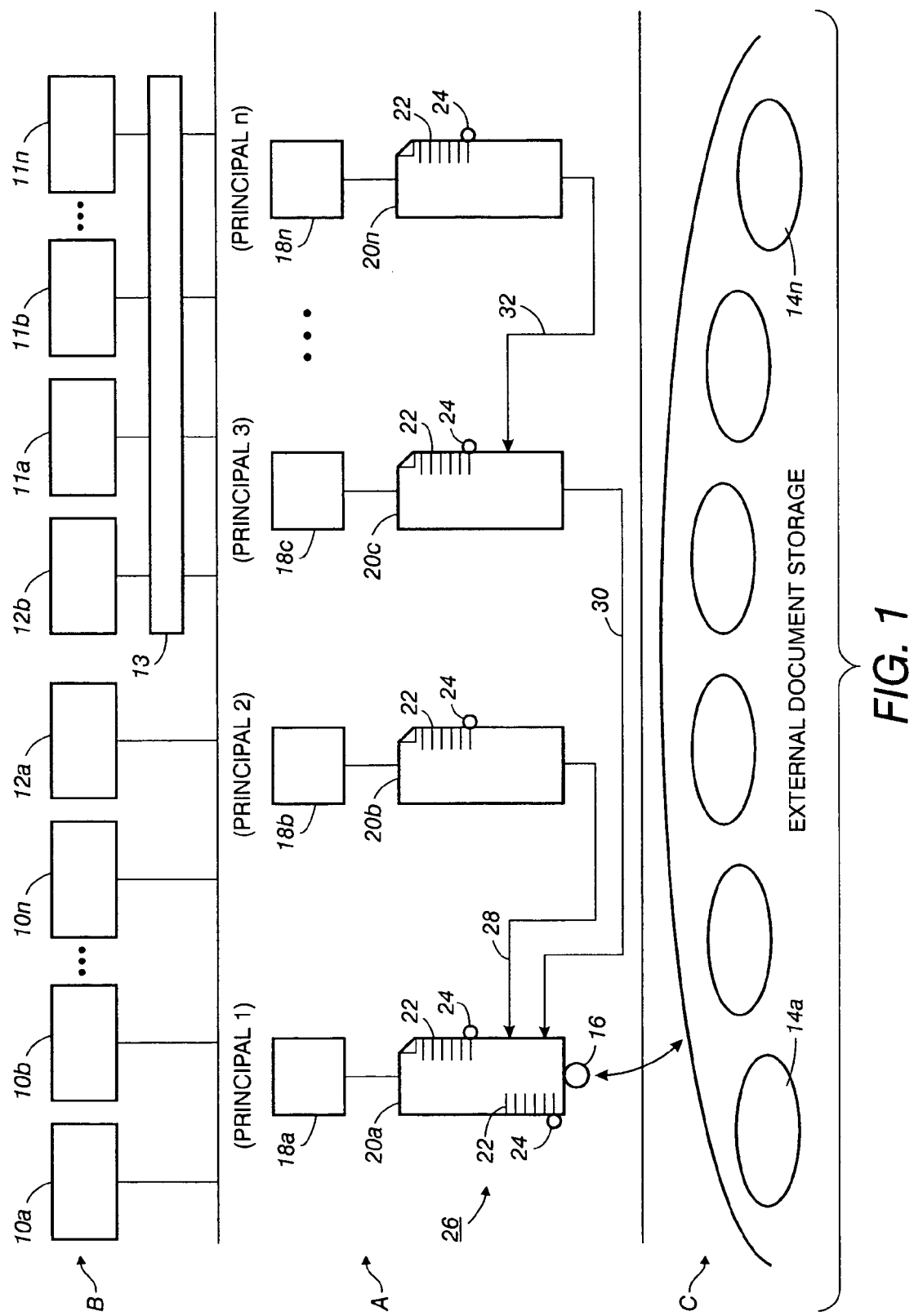
FIG. 1 is a generalized block diagram of a document management system in accordance with an exemplary embodiment of the present invention.

FIG. 1 sets forth the architecture of an exemplary document management system (DMS) A constructed in accordance with the present invention. DMS A is configured for operation with various front-end components B and back-end components C. Front-end components B include general-purpose applications 10a–10n and 11a–11n, such as word processing applications, web browser applications, and mail applications, among others. Some of the applications 10a–10n are "DMS aware," meaning these applications understand DMS protocols for storing, retrieving and otherwise interacting with DMS A. Other applications 11a–11n are "non-DMS aware," meaning they do not understand such DMS protocols. Browsers 12a (DMS aware) and 12b (not DMS aware) are specialized applications. A front-end translator 13 is provided in order for the non-DMS-aware applications 11a–11n and 12b to be able to communicate with DMS A.

In FIG. 1, back-end components C include a plurality of repositories 14a–14n, where documents and other various data sources are situated. In some exemplary embodiments, the repositories include the hard drive of a personal computer, a file system server, a web page, an e-mail server, a dynamic real time data transmission source, and other data storage mediums. Data sources such as documents, used in accordance with exemplary embodiments of the present invention, generally include content information and one or more properties associated with the document.

In FIG. 1, to retrieve data content from repositories 14a–14n, bit providers, such as bit provider 16, are used. Bit provider 16 is configured to translate protocols for reading and writing to documents stored in the repositories. Bit providers used in accordance with the present invention also provide additional operations such as fetching various versions of a document. Bit providers are preferably embodied as programmable blocks of code although, in alternative embodiments, they are implemented primarily in hardware such as programmable logic devices. The various bit providers used in accordance with exemplary embodiments of the present invention are described in greater detail below.

In FIG. 1, DMS A includes kernel 18a–18n for managing documents, such as documents 20a–20n. Each kernel 18a–18n is preferably associated with a respective principal 1-n. The principals 1-n are users of the document management system. Each person or thing that uses the document management system is a principal. A group of people can also be a principal. Each of documents 20a–20n is generally a document the corresponding principal 1-n considers to be of value and therefore has in some manner marked as a document of the principal. For example, the principal may have created the document. The document may also be an e-mail sent to or received by the principal, a web page found by the principal, a real-time data input such as an electronic camera forwarding a continuous stream of images, or any other form of electronic data (including video, audio, text, etc.).

In FIG. 1, the respective documents 20a–20n each have static properties 22 and/or active properties 24 associated therewith. A property is generally some information having a name and a value, as described in greater detail below. In alternative embodiments, the property includes a set of methods which may be invoked or executed. An active property is a property in which code allows the use of computational power to either alter the document or effect another change within the document management system. A static property is a name-value pair associated with the document. Unlike active properties, static properties have no behavior. Static properties do, however, provide searchable meta-data information about a document.

In FIG. 1, document 20a is a base document and is referenced by reference documents 20b–20c. There is preferably one base document per document. A base document represents the "essential" bits of a document. The base document is responsible for determining the content of a document and may contain properties of the document. The document content is the "core" information contained in a document such as the words in a text file or body of an e-mail message. Base document 20a has associated base properties 26 which can be static properties 22 and/or active properties 24. Static properties are shown with a "–" and active properties are shown with a "–o."

In FIG. 1, reference documents 20b–20c are configured to interact with base document 20a. Both base documents and reference documents also have associated static properties 22 and/or active properties 24. When principals 2, 3 access base document 20a for the first time, corresponding reference documents 20b–20c are created under kernels 18b–18c, respectively. Reference documents 20b–20c store links 28 and 30 to unambiguously identify their base document 20a. Each base document is stored with a document ID which is a unique identifier for that document. When reference documents 20b–20c are created, they generate links to the specific document ID of their base document. Alternatively, if principal n references reference document 20c, reference document 20n is created with a link 32 to reference document 20b of Principal 3. By this link principal n will be able to view (i.e. its document handle) the public properties principal 3 has attached to its reference document 20c as well as the base properties and public reference properties of base document 20a. This illustrates the concept of chaining.

In FIG. 1, while links 28–30 are shown from one document to another, communication within DMS A is normally achieved by communication between kernels 18a–18n. Therefore, when DMS A communicates with either front-end components B, back-end components C, or communication occurs between principals within DMS A, this communication occurs through kernels 18a–18n. Those skilled in the art will appreciate that exemplary embodiments of the present invention will work with other communication configurations as well. Using the described architecture, DMS A does not require the principal to operate within a strict hierarchy such as in file or folder-type environments. Rather, properties 22, 24 associated with various documents allow a principal to search and organize documents in accordance with how the principal finds it most useful.

In FIG. 1, principal 1 (owner of kernel 18a) creates a base document with content information, and stores the base document within DMS A. Principal 2 (owner of kernel 18b) wishes to use that document and organize it in accordance with its own needs, so principal 2 places properties on Reference Document 20b. By placement of these properties, principal 2 can retrieve the base document in a manner different than that envisioned by principal 1.

In FIG. 1, by interacting with browser 12a, a principal may run a query requesting all documents having a selected property. Specifically, a user may run query language requests over existing properties. DMS A manages a document space where properties are attached to various documents by different principals such that actions occur which are appropriate for a particular principal, and are not necessarily equivalent to the organizational structure of the original author of a document or even to other principals.

In FIG. 1, because the use of properties separates the inherent identity of a document from its properties, from a principal's perspective, instead of requiring a document to reside on a single machine, documents in essence can reside on multiple machines. For example, base document 20*a* can reside on all or any one of kernels 18*a*–18*n*. Further, since properties associated with a document follow the document created by a principal (for example, properties on document 20*b* of kernel 18*b*, may reference base document 20*a*), properties of document 20*b* will run on kernel 18*b*, even though the properties of document 20*b* are logically associated with base document 20*a*. Therefore, if a property associated with document 20*b* (which references base document 20*a*) incurs any costs due to its operation, those costs are borne by kernel 18*b* (i.e. principal 2), since properties are maintained with the principal who put the properties onto the document.

Support for Native Applications

A DMS document interface provides access to documents, typically as Java objects. Applications make use of this interface by importing the relevant package in their Java code, and coding to the API provided for accessing documents, collections and properties. In one exemplary embodiment, DMS Browser 12*a* is built at this level. The DMS document interface provides document and property classes with specialized subclasses supporting all of the functionality, such as collections, access to web documents, etc. Applications provide a direct view of DMS documents, some with a content-specific visualization, and some with a wholly different interface, using DMS as a property-based document service back—end.

Support for Off-the-Shelf Applications

Another level of access to DMS A is through translators, such as translator 13 in FIG. 1. In an existing embodiment, a server implementing the NFS protocol is used as the translator. This is a native NFS server, preferably implemented in Java. The translator, or DMS NFS server provides access to the DMS document space to any NFS client. The server is used to allow existing off-the-shelf applications such as Microsoft® Word® to make use of DMS documents. On personal computers, the DMS simply looks like another disk to these applications, while on UNIX machines, the DMS looks like part of the standard network filesystem.

Also, what is achieved through this translator is that DMS A is in the content and property read/write path for existing or off-the-shelf applications. By providing a filesystem interface directly to these applications, it becomes possible to execute relevant properties on the content and property read/write path. Furthermore, it is ensured that relevant properties (such as ones which record when the document was last used or modified) are kept up-to-date. Even though the application is written to use filesystem information, the DMS database remains up-to-date, because DMS A is the filesystem.

As part of its interface to the DMS database layer, the NFS provides access to the query mechanism. Appropriately formatted directory names are interpreted as queries, which appear to "contain" the documents returned by the query. Although DMS provides this NFS service, DMS is not a storage layer. Documents are stored in other repositories. However, using the NFS layer provides uniform access to a variety of other repositories (so that documents available over the Web appear in the same space as documents in a networked file system). The combination of this uniformity along with the ability to update document properties by being in the read and write path makes the NFS service a valuable component for the desired level of integration with familiar applications. It is to be appreciated that while a server implementing NFS protocol is discussed other servers could also be used.

Property Attachment

Figure 2:
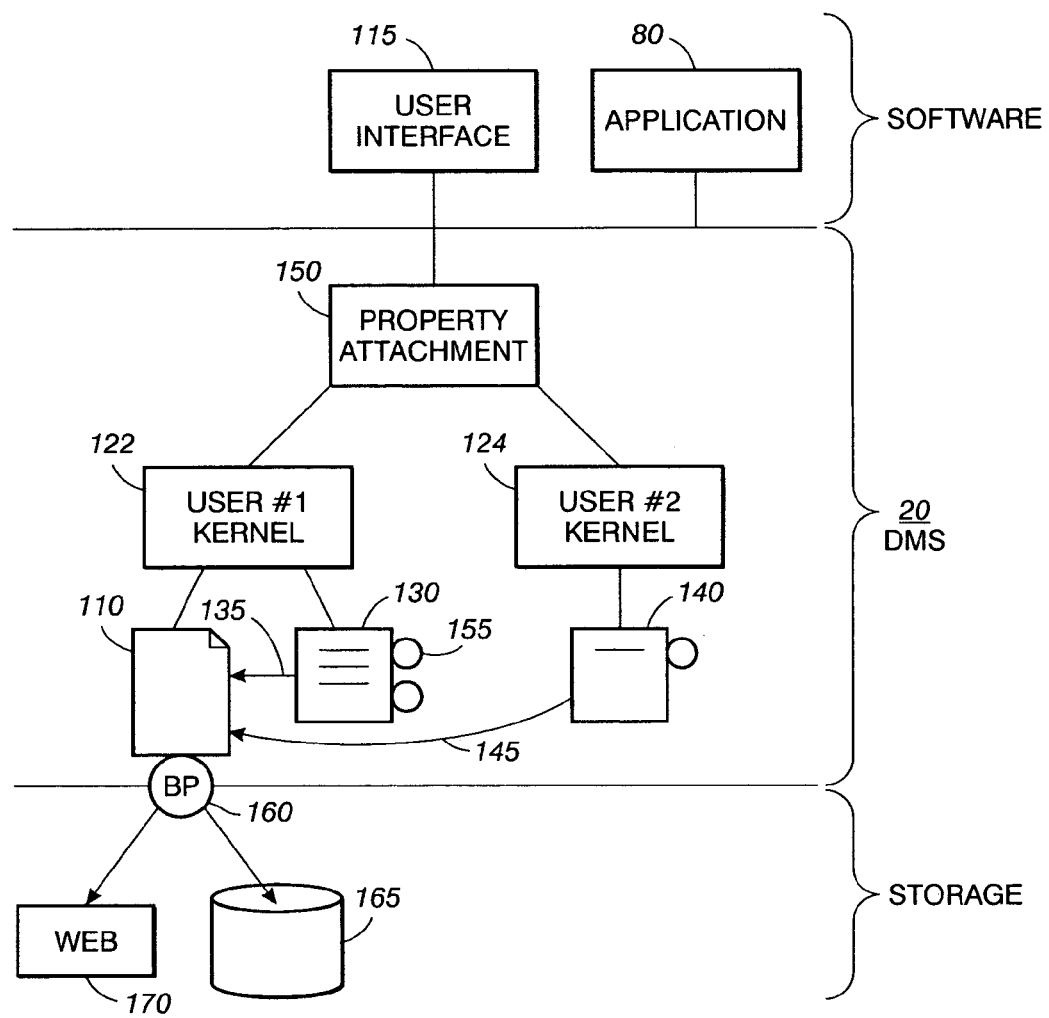
FIG. 2 is a generalized block diagram of mechanism for attaching properties to documents, in accordance with an exemplary embodiment of the present invention.

FIG. 2 shows a mechanism for attaching properties to a document 110 in accordance with an exemplary embodiment of the present invention. A user interface 115 allows a user to select a desired document and select one or more properties to be attached to the selected document. DMS A locates and retrieves the selected document in accordance with its management system protocol. As explained previously, documents are stored and retrieved based on their associated properties rather than hierarchical path and file names. In one embodiment, application 180 is DMS aware and it communicates to DMS A directly. In another embodiment, application 180 is non-DMS aware and communicates through translator 13 of FIG. 1.

In FIG. 2, the selected document 110 is found to be owned by a user #1. However, the user wishing to attach a property to document 110 is another user in the system. DMS A maintains properties on a per-user, per-document basis using individual kernels. Kernel 122 manages documents and properties for user #1, and kernel 124 manages documents and properties for user #2. Thus, user #1 can generate a set of properties 130 for document 110, associated via link 135, which are independent from the properties 40 of user #2, associated via link 45. In one embodiment, the properties are represented together with the base document as in FIG. 1, while in another embodiment, the properties are represented separate from the base document as in FIG. 2.

In FIG. 2, a property attachment mechanism 150 is provided by DMS A. This mechanism generates, configures and attaches a document reference 130 to the document 110 using association links 135. In an exemplary embodiment, document 110 is identified by a unique ID, and the document reference 130 refers to the document using the same unique ID. The document reference 130 includes static properties (represented by horizontal lines) and active properties (represented by circles). Static properties are simple name-value pairs on documents which are relevant to a user, for example, "author=Joe" or "topic=interesting." An active property 155 has a name-value and includes executable program code and/or instructions for automatically performing an operation or service without a user's involvement. Documents are collected, searched and retrieved based on static properties and/or active properties.

In FIG. 2, the active property 155 is configured to be activated by a triggering event which is defined by the user. Attaching the active property 155 to the document 110 forms an association between the property and the document. The association is external to the data that represents the content of the document 110. Thus, the association is independent of content type, the application format used to generate the document, and other characteristics of the document 110. The content of document 110 is controlled by a bit provider 160 which identifies the location of the data (e.g. local disk 165, world wide web 170, a camera, or any data supplying source), indicates how the data from the sources are combined to form the content of the document 110, includes a translation interface to communicate to the data source if required, and other selected parameters which define the content. Thus, a document is formed to include the base 110, a document reference 130 and one or more content data associated thereto. The document content may include associations to one or more other base documents which define a collection of documents.

Static Properties

The simplest properties are generally tags attached to documents. For instance, "important" or "shared with Karin" are tag properties representing facets of the document that are relevant to a document user. Only slightly more complicated are properties that are name/value pairs. For instance, "author=kedwards" is a property having "author" as a name component "author" and "kedwards" as a value component. There may be multiple properties with the same name. If a document has multiple authors, it may have multiple author properties. Also, the property's value may be arbitrary data. Although simple test strings are described for purposes of illustration, arbitrary data or code can be stored as property values.

Properties are generally either directly associated with base documents or grouped into document references that are associated with principals. Properties associated with the base document are base properties and are "published." The intent with published properties is to represent information inherent in a given document, such as its size or content type. Thus, any principal with access to the base document is able to see or review the published properties. As such, users should not use published properties for personal information. For instance, if a property used by a principal is the property "interesting" (i.e. a user wishes to collect all documents which he has tagged with a property defined as "interesting"), such a property is rarely inherent.

Active Properties

The static properties described above attach data to documents. They record information which can subsequently be searched or retrieved. However, some properties of documents have consequences for the way in which users should interact with them, and for the behavior of those documents in interaction. Consider the property "private." Simply marking a document as private is generally not enough to ensure that the document will not be read by others. So the "private" property should be more than a tag; it should also be a means to control how the document is accessed. Active properties are entities that augment and extend the behavior of the documents to which they are attached. That is, rather than being simple inert tags used to describe already-extant states of the document, properties can also be live bits of code that can support the user's desired intentions about the state of the document.

The active property mechanism provides a means to provide behaviors such as that required by properties like "private" which affect not only the document's status but also its behavior. At the same time, active properties afford this sort of interactive control in a way that maintains the advantages of a property-based system: document-centric, meaningful to users, and controlled by the document consumer. Active properties can be attached to documents just like static properties, but they also contain program code which is involved in performing document operations.

Active properties have three essential features: a name, a value, and active methods. Thus, any property can be made active by giving it active methods. Even properties thought of as being static are in some ways active since their "getValue" and "setValue" methods are provided by their class object. The getValue method is capable of getting the value of a property, and the setValue method is capable of setting the value on a property. The value of a property can be used by its active methods to store persistent data associated with the property.

Interaction with the document space is based on meaningful properties of documents, rather than the structure in which documents were filed. Using document properties in this manner means that interaction is more strongly connected to the user's immediate concerns and the task at hand rather than an extrinsic structure. In addition, the structure of the document space reflects changes in the state of documents, rather than simply their state when they were filed. However, collections still appear inside collections, and standard filing information—such as document ownership, modification dates, file types, etc.—are still preserved by the present system, appearing as document properties maintained by the infrastructure. Thus, a principal can recapture more traditional forms of structured interaction with document spaces.

Active properties can affect the behavior of the document in multiple ways: they can add new operations to a document as well as govern how a document interacts with other documents and the document management system in which it exists. For example, active properties are used to implement access control, to handle reading and writing of document content from repositories ("bit providers"), and to perform notifications to interested parties.

It is these active properties in the system, particularly the bit providers, which accomplish the "knitting" together of dynamic information described in the introduction. Since property code can perform arbitrary actions when it is invoked, properties can return arbitrary results based on the context of their use, and the state of the document management system at the time they are invoked.

Bit Providers

In FIG. 1, bit provider 16 acts as a mechanism to retrieve content from external storage repositories 14a–14n. Bit providers are also provided with the capability to translate appropriate protocols when necessary. Examples of the content which a bit provider is instructed to retrieve include a World-Wide-Web page, file system, e-mail server, or dynamic data such as an electronic video feed, etc. Once content is retrieved, it is supplied to the requesting document layer in a form having a DMS document format. Use of bit providers allows DMS A to manage documents completely independently of how the documents are stored, i.e. where the content of base document 20a exists. Thus, a user or principal does not need to worry about where the bits of the content actually exist. Rather, once within DMS A, a user or principal will simply view the content as a DMS A document and will perform management operations exactly the same way regardless of where the content is actually stored. This allows a single document management layer to run over a large variety of storage systems and storage architectures.

Bit providers work in terms of active properties. DMS A assigns responsibility for providing the document content to an active "bit provider" property. Code associated with the property handles all requests to read or write the document's content. This gives the property the ability to undertake additional kinds of activities. Among these are caching, meaning it can make a local copy of content that is otherwise stored remotely. A further activity is access control, where the bit provider is informed of the requester of each request, and can deny the request based on access control criteria. A further activity is configuration management. Particularly, since the bit provider mediates all requests for the document content, bits can be stored at any accessible place. Part of its decision of where to store them can be in response to configuration management information recorded in properties. Yet another activity of the bit provider is collections of documents. For these collections, the "content" is actually a collection of other documents, and a bit provider manages the record of that collection. Another feature of bit providers is that they are replaceable, i.e. a particular base document may change from one bit provider, to another having different capabilities.

Figure 3:
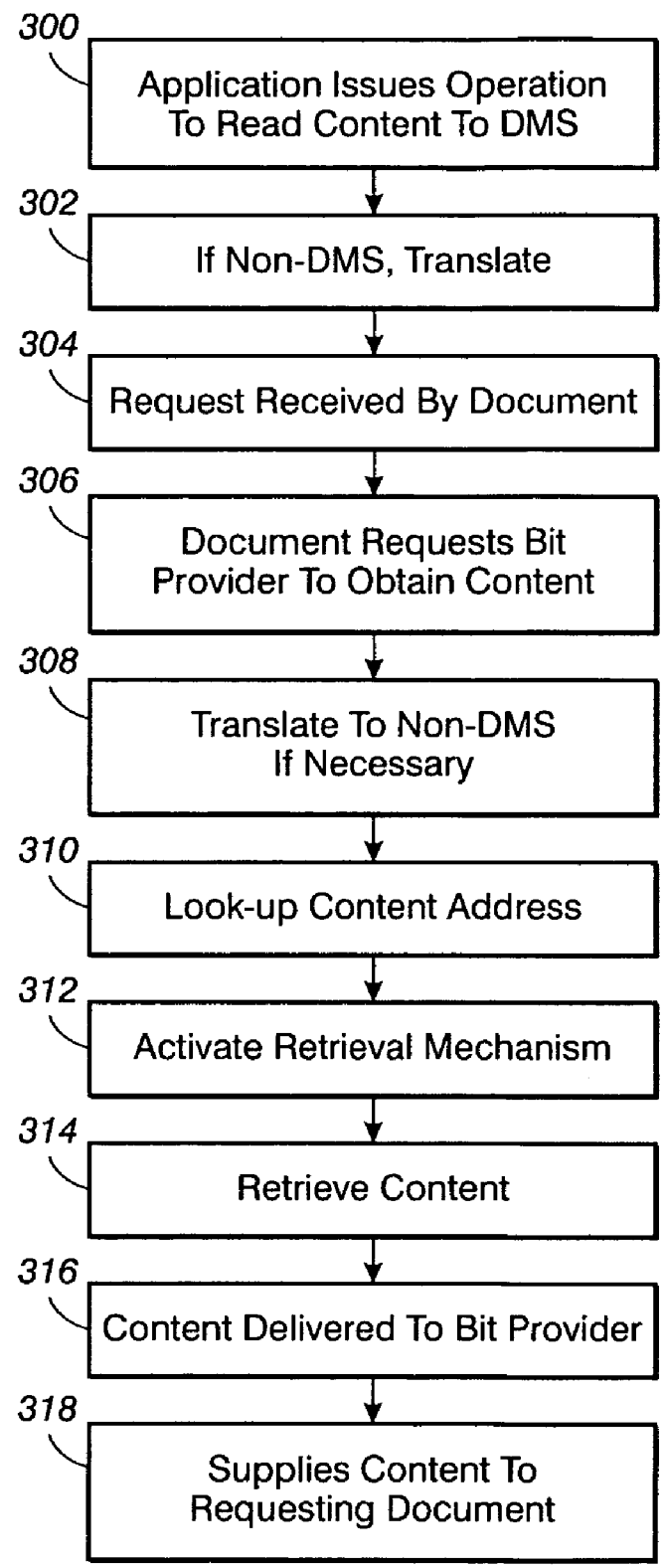
FIG. 3 is a flow diagram of a method for retrieving content information from a data source using a bit provider, in accordance with an exemplary embodiment of the present invention.

In FIG. 3, a flow chart of a request issued to DMS A requiring implementation of a bit provider is set forth. An application issues a request to read the content of a document to DMS A (300). If this request is in a non-DMS-protocol, the request is translated (302). Thereafter the translated request (or the DMS-aware request) is received by the document (304). The document then forwards a request to its bit provider, asking for the content of the document (306). The bit provider knows the type of environment (the web, hard disc, e-mail, etc.) in which the document content is stored. The bit provider also knows whether the requested document content can be obtained directly or whether a translation to a non-DMS-aware protocol is required (308). The translation step includes looking up the document content address for the known storage protocol (310). The bit provider then activates an appropriate retrieval mechanism to communicate with a storage system outside of DMS A (318). The storage system then retrieves the content (314) and returns it to the bit provider (320). Next, the retrieved content is supplied to the document whereby a user may view or otherwise manipulate the content of the document (318). The bit providers are configured to read/write content of a specific storage repository or system. It is to be appreciated however, that a bit provider which can read/write to a number of different storage systems is also possible in accordance with the present invention.

Bit providers are generally types of active properties which include at least the capability of knowing how to perform read/write content operations. Since the bit provider is in the form of a property, it is possible to attach bit providers to documents. The use of bit providers as its mechanism of retrieving data allows for a unified presentation of content to DMS A for document management.

Documents as a Metaphor for the World

The document management system described above provides an infrastructure for document-centric computing. Documents which reflect objects and tasks commonly used in office work are created and processed by this infrastructure, including representations for physical devices, people, abstract tasks, processes such as workflow, and other computational resources including the document management system itself.

The semantics and behaviors of documents used in accordance with the present invention are augmented and enhanced by the document management system. General-purpose applications use the documents, and tools specifically written for use with the document management system interact in a general way with the documents. The documents provide portions of their own user interface and application behavior, in contrast with conventional systems in which only applications provide these features. Through this mechanism, applications which are open to runtime extensibility are configured by the documents they are working with to have new behaviors and interfaces.

Physical Devices as Documents

Exemplary embodiments of the present invention provide for the modeling of physical devices as documents. These documents are "first-class" documents, in that they support organizing, sharing, annotating and customizing.

Figure 4:
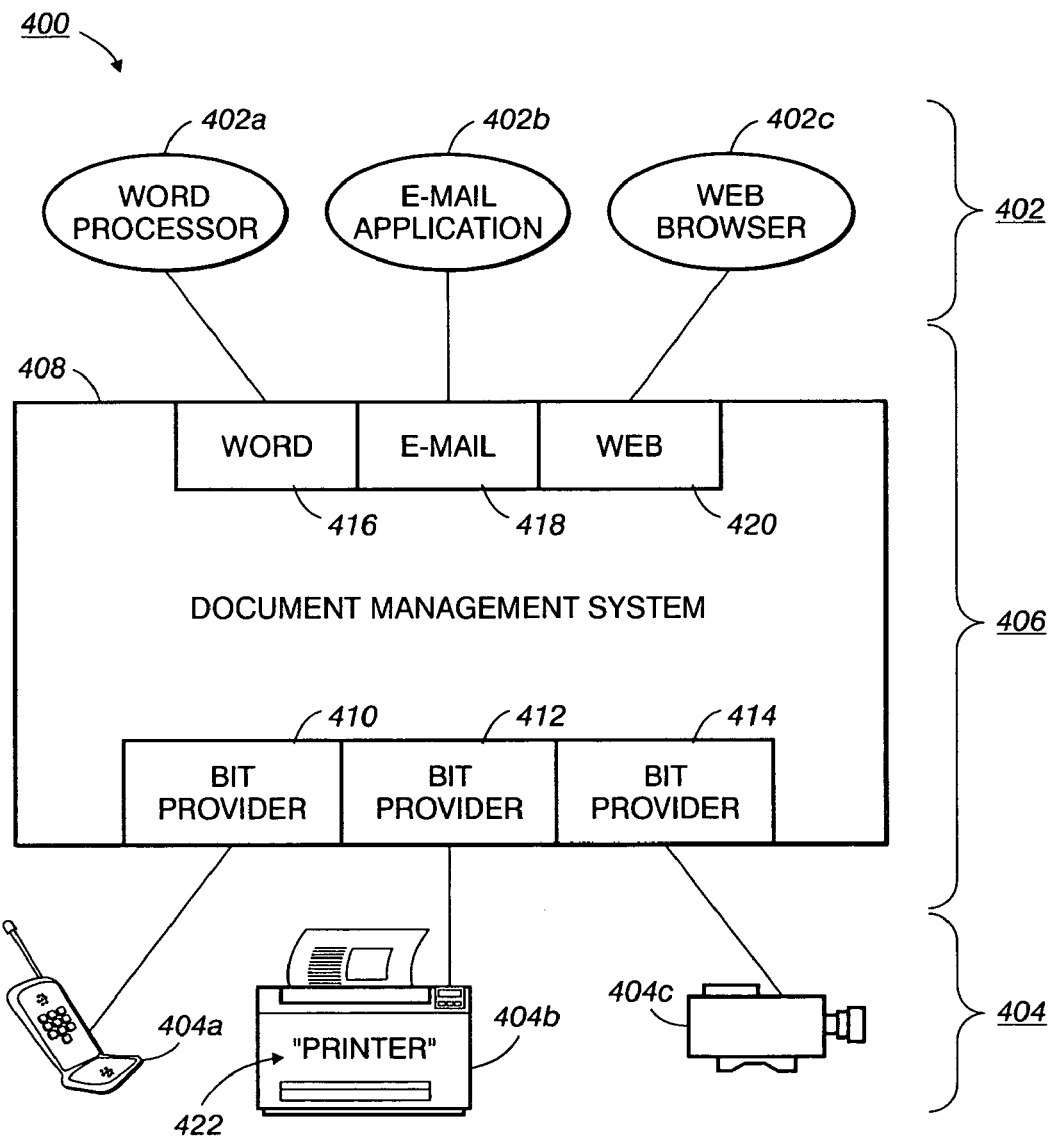
FIG. 4 is a generalized block diagram of a system 400 for representing a physical device as a document, in accordance with an exemplary embodiment of the present invention.

FIG. 4 is a generalized block diagram of a system 400 for representing a physical device as a document, in accordance with an exemplary embodiment of the present invention. System 400 incorporates an exemplary document management system constructed according to the present invention, such as DMS A of FIG. 1. An application layer 402 is provided in system 400. The application layer 402 includes a plurality of applications, in particular, word processor application 402a, e-mail application 402b, and web browser application 402c. In alternative exemplary embodiments, other general-purpose and specific-purpose applications, including those described above, comprise application layer 402.

In FIG. 4, system 400 further includes a device layer 404 in which a number of physical devices are situated. These include a telephone 404a, a printer 404b, and a camera 404c. Telephone 404a is any wired telephone or cellular phone, such as a Nokia 6190 GSM cellphone, in which data such as a personal phonebook can be stored. Phone 404a is also configured to output signals such as Short Message Service ("SMS") messages. The printer 404b is any suitable printer coupled directly to a personal computer or coupled to a computer network. The Xerox DocuPrint network printer is one example. The printer and network communicate using any suitable protocol. The camera 404c is any camera capable of outputting image files preferably in digital format, although cameras which output "analog" image files which are subsequently converted to digital format are also contemplated within the scope of the present invention.

In an alternative exemplary embodiment, a data storage layer is incorporated, including one or more repositories such as repositories 14a–14n of FIG. 1. These repositories are coupled to one or more of devices 404a–404c such that data files may be communicated from the various devices to the repositories and stored for later processing.

In FIG. 4, a document management layer 406 is interposed between device layer 404 and application layer 402. Layer 406 incorporates an exemplary; document management system 408 which includes a plurality of bit providers, namely bit provider 410, bit provider 412, and bit provider 414. Bit provider 410 is in communication with telephone 404a, bit provider 412 is in communication with printer 404b, and bit provider 414 is in communication with camera 404c.

In FIG. 4, the document management system 408 further includes a plurality of application interfaces in communication with applications 402a–402c for allowing document management system 408 to interface with applications 402a–402c. These include word processor interface 416, e-mail interface 418, and web interface 420 in communication with the respective applications 402a–402c. The application interfaces 416, 418, and 420 are configured to receive documents from any of the bit providers 410, 412, and 414, and to provide the documents to the various applications.

In FIG. 4, telephone 404a is in direct communication with bit provider 410 via, for example, a serial port on the phone coupled to a receiving port of a computer implemented as part of document management system 408, and using an appropriate protocol. In an alternative embodiment, a repository is coupled between telephone 404a and bit provider 410. Telephone 404a affords at least two document representations. A first representation is as a carrier of a personalized phonebook, stored in a memory unit within telephone 404*a* as a list of names and associated phone numbers. A second representation is the role of the telephone as sender and receiver of Short Message Service ("SMS") messages.

In FIG. 4, when the user opens a document representing the phone, bit provider 410 is configured to read the content of the phonebook from telephone 404*a* into document management system 408. This ensures that the user gets the latest version of the phonebook from the phone. The content is then provided to any of applications 402*a*–402*c* as a document. The user of any of applications 402*a*–402*c* can view and edit the document, via the respective application interface 416, 418, or 420. Writing to the document updates the stored information on the telephone itself. The phonebook content information can be indexed and edited using existing applications 402*a*–402*c* provided, for example, on the desktop of a personal computer. With some particular telephones, information can only be read or written if the phone is physically docked with the computer. The document management system binds the "readable" or "writable" attributes of the phonebook document to the phone's connection to the computer.

In FIG. 4, the phone 404*a* also sends and receives SMS signals or pages to and from document management system 408. This role is represented as a separate document which, when read, downloads a list of stored messages from the phone's memory via any suitable connection, such as a serial port, and presents them as the document's content. Any text written to this document is sent via an SMS or e-mail gateway to phone 404*b* represented by this document. In some embodiments, messages can be read only when the phone is docked, but messages can be written anytime. So, for example, one can message a remote user by opening his or her phone document in Microsoft® Word® or some other tool, creating some content, and then saving the file.

While specialized tools can provide access to all of these features of the phone, the multiplicity provided by document management system 408 allows the leveraging of existing tools in a powerful way. For example, both the phonebook and SMS documents can be indexed by existing tools such as AltaVista Personal, edited via existing tools such as Microsoft® Word®, and grouped and managed in collections just as any other document on the desktop.

In FIG. 4, another example of representing a physical device in accordance with an exemplary embodiment of the present invention is a printer document. The printer document is instantiated by creating a new document with a "Printer_Bit_Provider" attached to it. The Printer_Bit_Provider, illustrated in FIG. 4 as bit provider 412, searches for a property 422 named "Printer" that designates the name of the printer it represents. Reading from this file generates content representing the current state of the print queue of printer 404*b* at the time at which the queue is read, that is, a list of the printing jobs queued to be printed. Any content written to the document is printed. For example, using Microsoft® Word®, a user may create a text file. Using the "Save As" function of Microsoft® Word®, the user may save the text file to pathname of the printer document (e.g., "C:\virtualdocs\printer"), causing the text file to be sent to the printing queue as a printing job.

In FIG. 4, yet another example of a physical device modeled as a document, in accordance with an exemplary embodiment of the present invention, is camera 404*c*. Bit provider 414 is configured to generate a stream of digital images, in a suitable format such as JPEG, read from camera 404*c* in similar fashion as reading the phonebook from phone 404*a*, as discussed above. The digital images are assembled to define a camera document, accessible by any of applications 402*a*–402*c*. In an alternative embodiment, a repository is coupled between camera 404*c* and bit provider 414. In this way, the digital images are first downloaded from camera 404*c* to the repository as an image file before being assembled by bit provider 414 to define the camera document.

In accordance with another exemplary embodiment of the present invention, a method and system are provided for representing the structure and functionality of a UNIX machine as a document. A variety of commands are available for controlling software processes operating on UNIX machines, such as "vs," "pipe," "grep," "ps," "df," and "vmstat." All of these commands have different arguments, and the user interacts with them in a variety of ways. Rather than using these arcane UNIX commands, however, exemplary embodiments of the present invention provide for a document which functions as an interface for controlling the UNIX machine. In particular, reading the document shows the status of the UNIX machine, such as what version of the OS is running, how much free memory there is, and what applications are running. This is achieved by configuring the appropriate bit provider to execute various UNIX commands needed to retrieve the desired information. Any UNIX viewer or editor application may be used, such as emacs which is particularly well-suited to viewing text formats.

In another exemplary embodiment, the UNIX document is writable. A list of processes currently executing on the UNIX machine is retrieved by the bit provider and included as part of the document. The bit provider is configured to store the names of the processes retrieved in memory available on some machine. Deleting lines from the list of current processes causes those processes to be terminated. Specifically, the bit provider recognizes that a process name has been deleted from the list and runs the necessary UNIX commands to kill the process. In one exemplary embodiment, the bit provider does this by comparing the list of process on the document, after the document is saved, with the names of the processes previously stored in memory. In this way, any processes which have been deleted are thus recognized, and the otherwise "messy" operation of determining what, if anything, has malfunctioned and killing an errant process is reduced to a well known view, edit, save cycle.

People as Documents

One of the entities computer users often work with on-line is other people. As explained above, document management systems constructed according to the present invention provide for a cryptographically secure notion of a principal, with a one-to-one correspondence to physical users.

According to one exemplary embodiment of the present invention, the users of computers in a network are maintained as "person documents." One or more of these documents are used by a principal as the locus of interaction with that principal. Thus, all references to a principal are preferably established as references to that principal's document. Knitting is used to build a representation of the state and context of the person in the world at the time the document is viewed.

Figure 5A:
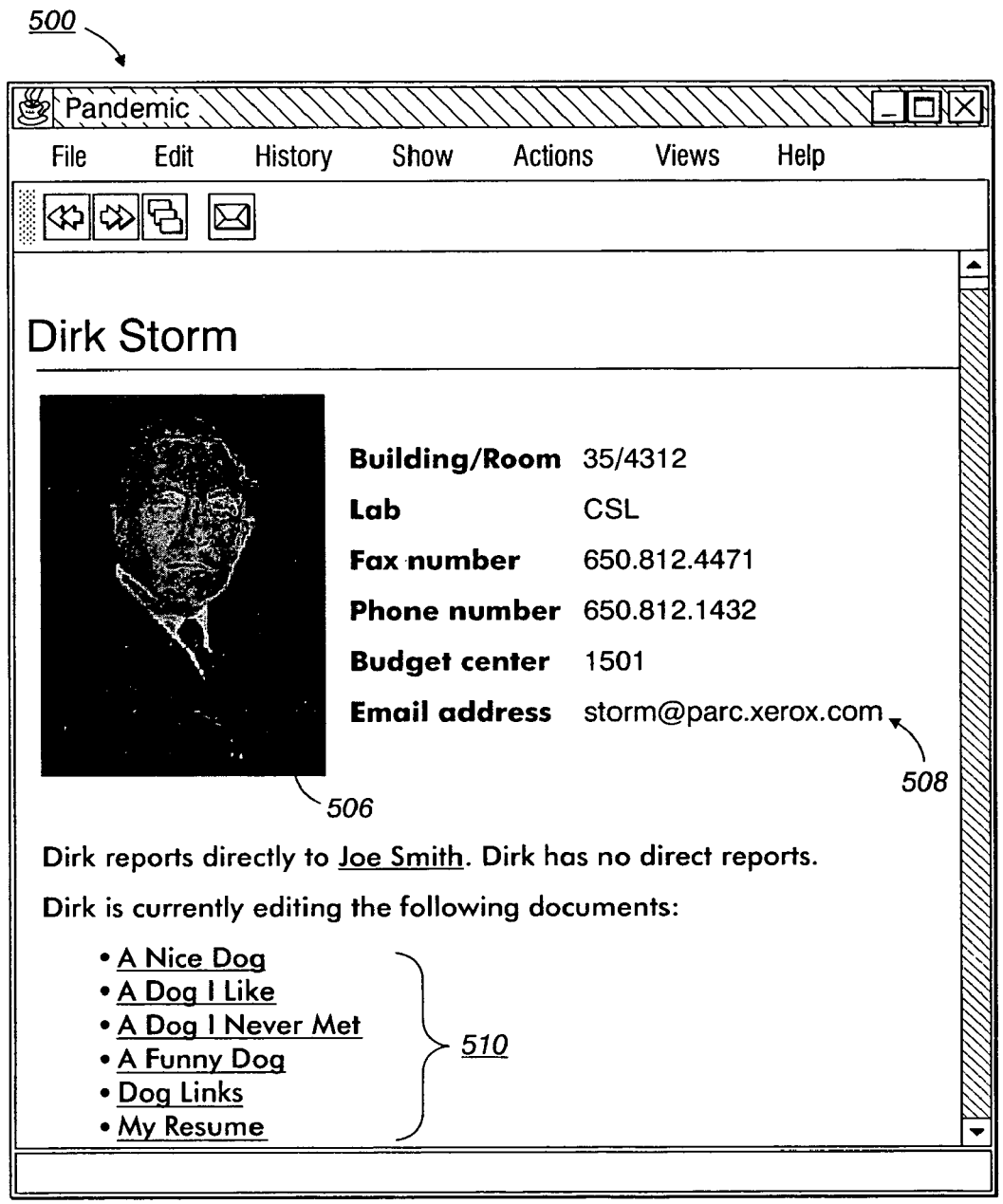
FIG. 5A is a screen display of a document 500 representing a person, created in accordance with an exemplary embodiment of the present invention.
Figure 5B:
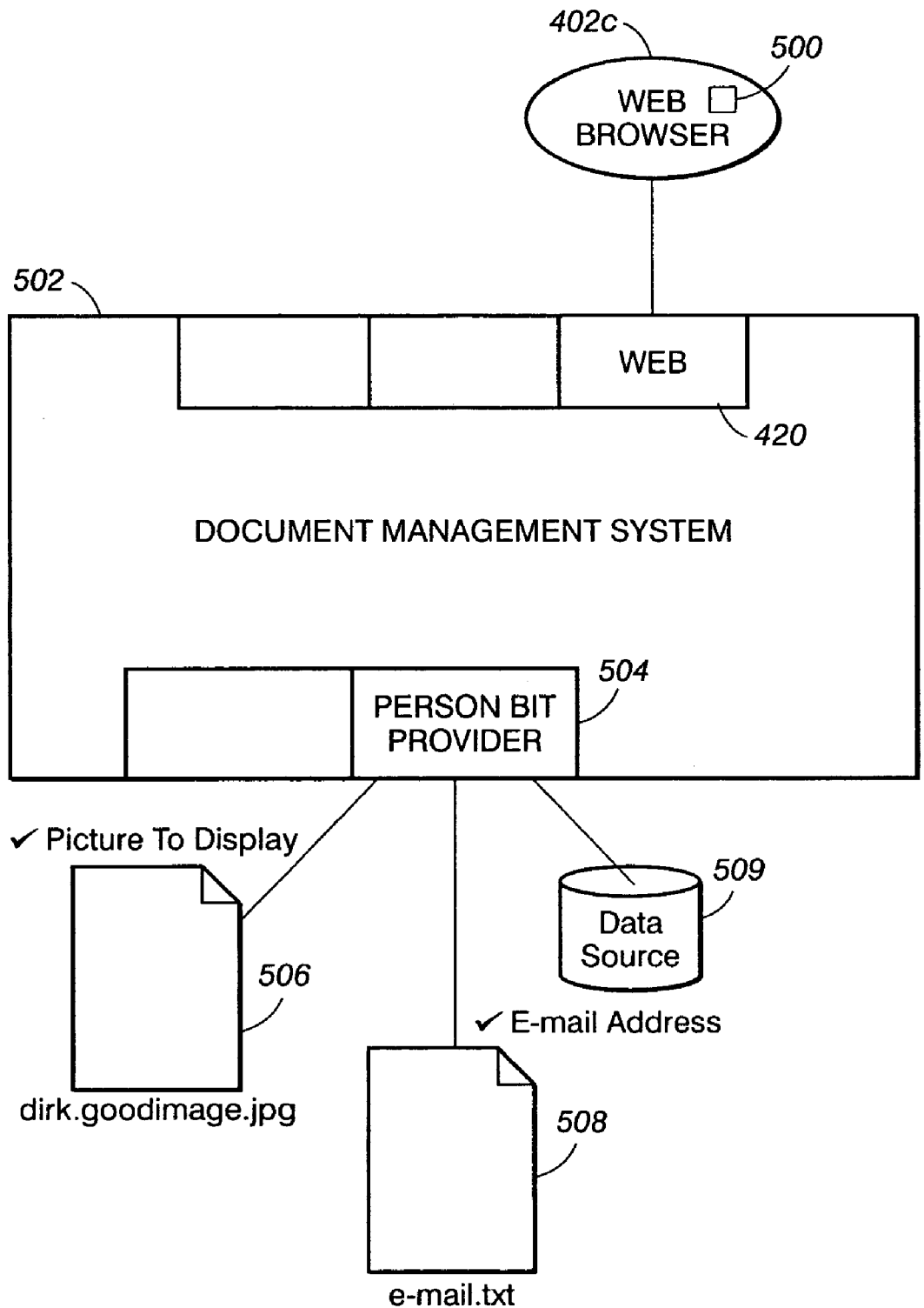
FIG. 5B is a generalized block diagram of a system for representing a person as a document, in accordance with an exemplary embodiment of the present invention.

In FIGS. 5A and 5B, a person document 500 is created according to an exemplary embodiment of the present invention. The person document 500 is assembled using an exemplary document management system 502, such as DMSA of FIG. 1. The person document 500 is displayed using one or more applications in communication with document management system 502, such as web browser 402c in communication with the system 502 via web interface 420.

In FIG. 5B, a bit provider 504 is provided as part of document management system 502. Bit provider 504 is in communication with various data sources, including image document 506 and e-mail address document 508. In this example, image document 506 is a JPEG image file, "dirk.goodimage.jpg." A property "PictureToDisplay" is attached to image document 506. Similarly, e-mail address document 508 is a text file, "e-mail.txt," to which the property "E-mailAddress" is attached. In this exemplary embodiment, properties may only be attached by a user logged into the computer network as Dirk Storm. Dirk sets properties based on personal preferences. For example, Dirk may associate the "PictureToDisplay" property to other JPEG image documents accessible by bit provider 504. In other exemplary embodiments, other users have permission to attach and detach properties to and from various data sources.

In FIG. 5B, the bit provider 504 is configured to identify the data source to which the "PictureToDisplay" property is attached, in this case, image document 506. The bit provider 504 is further configured to identify document 508 as having the attached "E-mailAddress" property. Bit provider 504 is further configured to identify additional data sources having further associated properties, as specified by the programmer of bit provider 504. Examples of such additional data sources include telephone numbers, fax numbers, building numbers, and other personal information. After identifying image document 506 and e-mail document 508 as having the respective associated properties, bit provider 504 retrieves the content of these documents. Bit provider 504 then combines the retrieved content information to define document 500, as shown in FIG. 5A. The document 500 is displayed in HTML or other suitable format by web browser 402c.

In FIGS. 5A and 5B, the bit provider 504 is further configured to construct "live" content based on the context of the user in the world. In particular, when the bit provider constructs the person document 500 for a given user, a list of all documents that the user currently has "open" are retrieved. In the exemplary embodiment of FIG. 5A, these documents are represented as HTML links 510 to the actual documents. Such is an example of knitting, the construction of dynamic, live content from multiple sources. Multiplicity is also provided in that, since these documents are available as web documents, they can be accessed through a web browser or other tool which understands HTML.

In FIGS. 5A and 5B, writing to person document 500 transmits the written information to the person represented by the document, using similar techniques as described above with regard to updating the phonebook of a cellular phone. A property on the document, settable by its owner, denotes the "preferred" contact method—mail, SMS message, or other protocol. The bit provider for the document consults this property to determine how to transmit the information. In some embodiments, it also uses the type and size of the information in its process. In one example, the user simply drags an electronic document on his desktop onto person document 500, and the bit provider is configured to immediately sent the file to the person's e-mail address. This way, the user can quickly send files to the person without spending the additional time required to interact with an e-mail application.

Computation as Documents

Another entity which is represented as a document, according to an exemplary embodiment of the present invention, is a computational process. For example, documents are created for at least two computational processes: the Java Remote Method Invocation ("RMI") registry, and the document management system itself. Other examples of computational processes represented as documents in accordance with exemplary embodiments of the present invention include Oracle database software.

Figure 6:
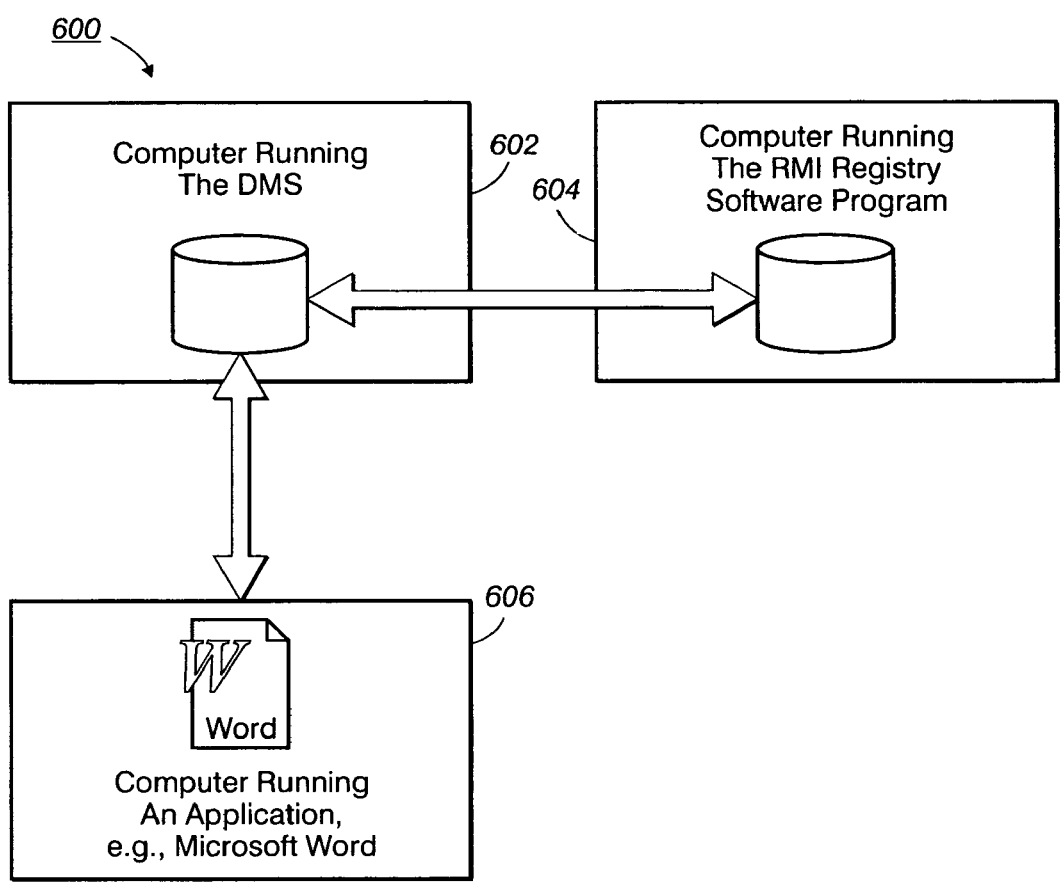
FIG. 6 is a generalized block diagram of a system for representing a Java Remote Method Invocation (RMI) registry as a document, in accordance with an exemplary embodiment of the present invention.

FIG. 6 is a generalized block diagram of a system 600 for representing a Java RMI registry as a document, in accordance with an exemplary embodiment of the present invention. System 600 includes a computer 602 on which an exemplary document management system of the present invention is implemented. Computer 602 is in communication with another computer 604 on which an RMI registry program is operating. Communications are provided over, for example, a local area network ("LAN"), using an appropriate network protocol allowing remote access to information maintained by the RMI registry program. A bit provider in the document management system of computer 602 is configured to understand the protocol of the RMI registry, and to provide access to the information stored therein via a document.

In FIG. 6, a nameserver, or registry, is provided on computer 604, and preferably on each host on which a remote object runs. An RMI registry document is provided that represents the state of the RMI registry, particularly the objects named in the registry. When a user of computer 606, running an application such as Microsoft® Word®, opens the RMI document, a bit provider contacts the registry and retrieves the relevant information. When the information is available as an RMI document, the information may be read, written or manipulated by any existing applications, such as Microsoft® Word®. Writing to the registry causes new objects to be registered, and/or changes the state of the registry, using similar methods as described above. In an alternative exemplary embodiment, the registry document is not writeable.

Figure 7:
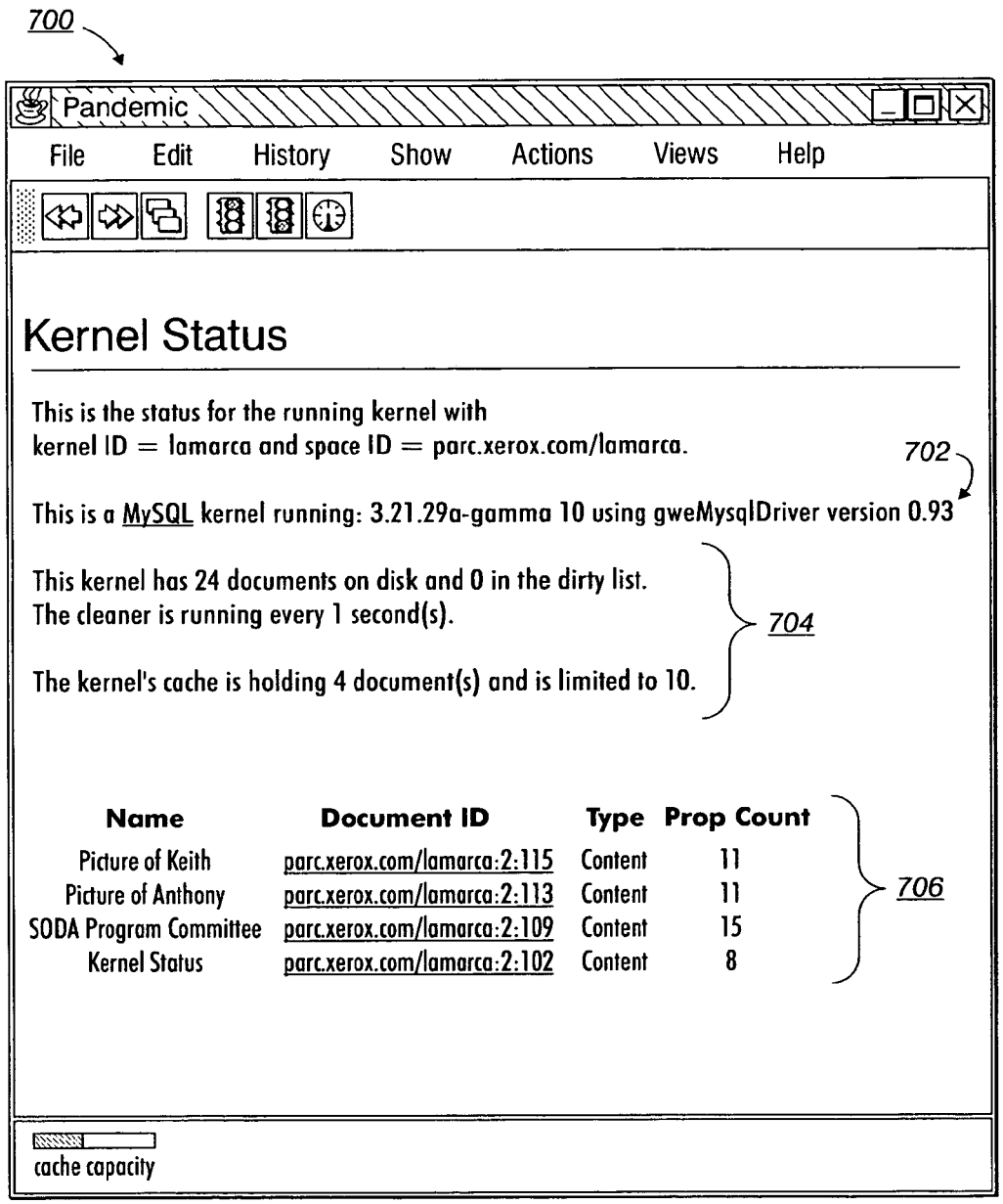
FIG. 7 is a screen display of a document 700 representing status of a kernel of an exemplary document management system, created in accordance with an exemplary embodiment of the present invention.

In FIG. 7, a kernel within the document management system is represented as a document 700, according to an exemplary embodiment of the present invention. The kernel document 700 represents the instantaneous state of a user's kernel. The bit provider creates a document that contains information 702 describing the type of the kernel, including the version number, database implementation, and other information. In addition, the bit provider provides information 704 about kernel status including whether certain internal threads are active, and the number of documents currently in the kernel's internal cache. More detailed information 706 identifying these documents is also provided.

The kernel document is updated as the kernel changes states. The kernel document uses properties to provide mechanisms for controlling the document from various applications, using techniques explained in greater detail below.

Tasks as Documents

According to another exemplary embodiment of the present invention, abstract tasks are represented in the document domain. In one example, a workflow process is reflected in documents and properties.

In a conventional workflow system, a workflow application is used to shepherd some document through a set of required steps, usually approvals by managers, until the document reaches a final state. This workflow application understands the semantics of the particular tasks being administered via some rule set that encodes the company's policies. The workflow application provides a centralized point of focus for the process; the documents that are approved move through this process under the control of the workflow tool.

According to an exemplary embodiment of the present invention, rather than using a single workflow application that operates on particular types of form documents, any type of document can be used as the object of a workflow. This is achieved by attaching a bit provider and a plurality of properties to the document to transfer the functionality of the workflow application to the document itself. In this way, the document is used to represent the abstract process of a particular workflow situation, as opposed to using a specific application that manages a given workflow interaction.

One example of representing a task as a document, according to an exemplary embodiment of the present invention, is a travel approval document used by an employee of a corporation to obtain management permission to take a trip. The document created represents the abstract process of travel approvals. The travel approval process is simple: employees submit trip itineraries for approval, which requires consent from both the employee's manager and department head. Employees can easily submit these trip requests and check on the status of their requests. Managers can easily access travel requests requiring their attention.

Users construct their itineraries as they wish and choose the application and document format of their choice. For example, a user may write a note in Adobe FrameMaker, or submit an Microsoft® Excel® spreadsheet with detailed cost information, or simply scan in a paper copy of a conference invitation. These are all acceptable forms of itinerary documents used in accordance with exemplary embodiments of the present invention. This process differs significantly from traditional workflow systems in which relevant data must be manipulated with proprietary integrated tools.

To enter the new itinerary into the travel approval process, the user opens a standard document browser, for example, Windows Explorer. Using a pointer, the user then "drags" the itinerary document, created as described above, onto a trip status document which serves as a central point of coordination for the approval process. Once an itinerary has been dragged onto the trip status document, the approval process in underway, and the employee's work is done, short of checking on the status of the trip. When a trip has been approved or denied by the relevant people, the employee is sent an email notification of the result.

Figure 8:
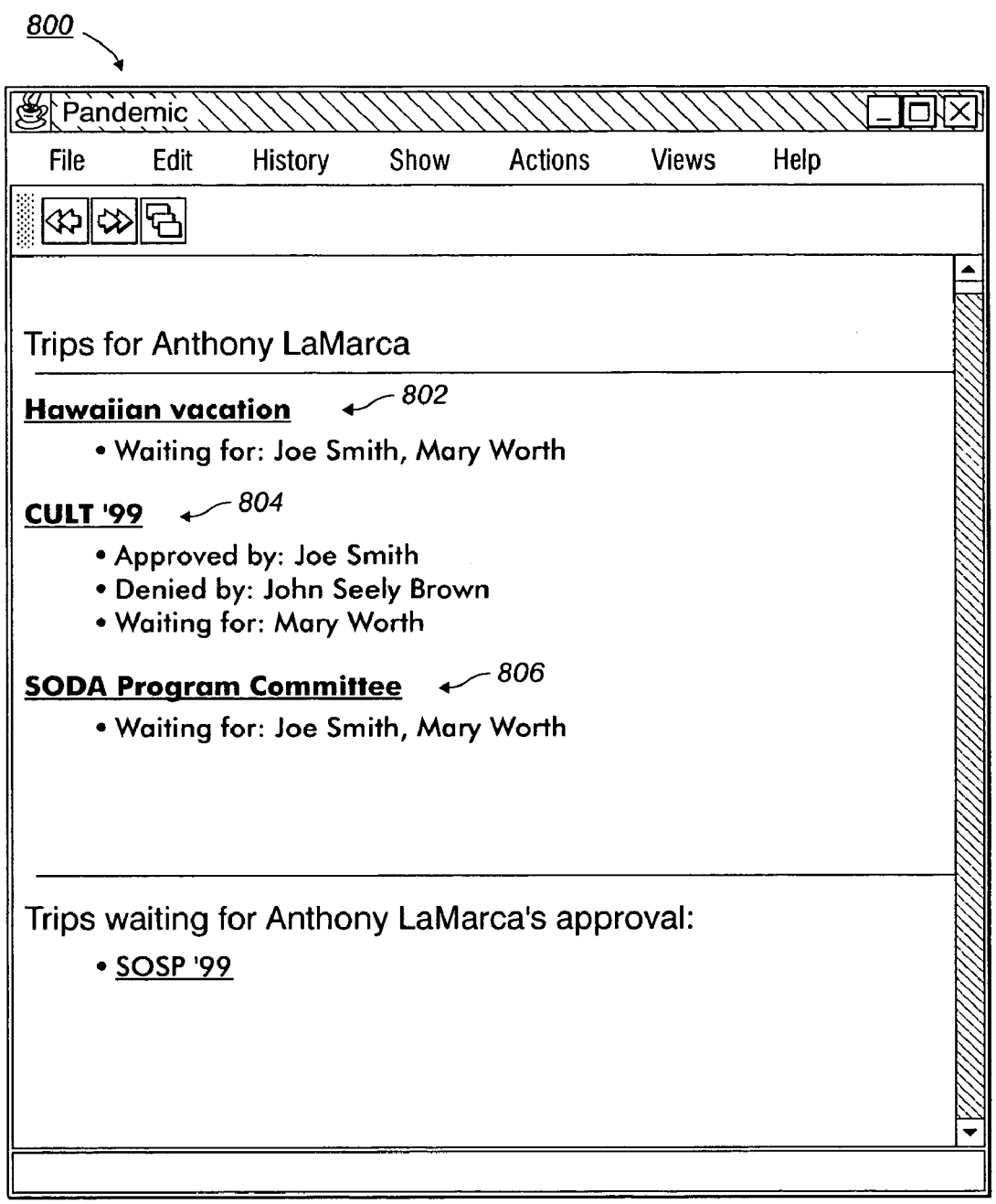
FIG. 8 is a screen display of a trip status document 800 representing a process of travel approvals, created in accordance with an exemplary embodiment of the present invention.

FIG. 8 shows an exemplary trip status document 800 created in accordance with an exemplary embodiment of the present invention. The document 800 serves as a "drop target" for new trip itinerary documents, as described above, and contains content that summarizes the state of travel plans for a user, Anthony LaMarca. In this example, the content of document 800 is in HTML format. The document 800 contains a summary of all of the trips for which Mr. LaMarca has submitted requests, in this example, "Hawaiian Vacation" 802, "CULT '99" 804, and "SODA Program Committee" 806. These trips 802–806 are provided on document 800 in hypertext, with encoded hyperlinks to other web pages containing more information about the particular trip or event. Various status information is provided under each trip 802–806. In this example, Mr. LaMarca must gain approval for trips from Joe Smith, Mary Worth, and John Seely Brown. Under each trip listing 802–806, information showing whether these Joe, Mary and/or John have approved the respective trip is displayed.

In FIG. 8, trip status document 800 is beneficial because an employee can execute any application that is compatible with HTML, such as Netscape, Microsoft® Word®, and Adobe FrameMaker, and view document 800 to check on the status of his pending trip. The contents of trip status document 800 also help managers by giving them a list of the itineraries that require their attention. The trip status document serves as a nexus of coordination for those both taking trips and approving trips; and its content is dynamically updated as the states of the pending and processed travel approvals change.

In FIG. 8, the actual approval or denial of a trip is performed on the itinerary document itself. When a manager opens a travel itinerary document that requires his vote, he views the document and is presented with a Yes/No voting box. This box is created by an active property, which allows him to decide to approve or deny the trip. This arrangement is significantly different from classic workflow, because users of exemplary systems of the present invention do not need to execute any workflow software. In the present example, a manager simply opens the document to view or edit the document, and the system augments its normal interaction to include access to the user interface components needed to drive the workflow process.

In another example, a browser application communicates with a document management system, constructed according to an exemplary embodiment of the present invention. When a document is opened using the browser application, the application is configured to identify properties associated with the document to determine if any new menu items or graphic buttons are to be displayed when the document is presented to the user. In this way, different documents have different user interface components, and the application itself changes as the various documents are opened and presented to the user (e.g., different menus, buttons, control panels).

In FIG. 8, to create trip status document 800, at least two active properties are used. The first is a "Status" bit provider which is attached to the trip status document. This property provides two functions. First, it monitors "drops" of itinerary documents, as described above. Responsive to a drop, the Status bit provider starts the itinerary document in the travel approval process. This is done by determining the user's manager and department head from organizational information stored in other documents that represent the users of the system, and attaching copies of the second property, described below, to the dropped document. The dropped document becomes—in addition to whatever other roles it is performing—a trip request. Second, the Status bit provider provides HTML content which summarizes the state of the user's trips. This includes querying for travel documents and formatting the results in HTML. Since the bit provider is invoked whenever content is required, it can dynamically generate new information based on the state of the world at the time it is invoked.

The second new property is an "Approve/Deny" property, which is what managers interact with when casting votes on a trip. This property determines if the user is currently viewing the document it is attached to is a manager whose decision is needed for the particular travel request. When appropriate, the property creates and displays a graphical user interface ("GUI") component with a Yes/No button for voting. Clicking on one of these buttons records the manager's vote on the document and, in some exemplary embodiments, sends the employee notification if appropriate. Applications in communication with the document management system check for the existence of these components and display them alongside the document content. In an alternative embodiment, the Approve/Deny property creates a separate, stand-alone GUI control panel that appears whenever a travel request is viewed by any application.

The knowledge and state of the travel approval process is distributed between the two properties described above. The Status bit provider adds and configures properties in order to turn an ordinary document into a pending itinerary. Any one instance of the Approve/Deny property knows about a single manager's vote, but knows nothing about how any other managers voted.

In FIG. 8, opening the document 800 causes the Status bit provider to scan the repository and retrieve a plurality of documents flagged with properties indicating usage in the travel approval process. The bit provider then generates an instantaneous summary of the state of the world from the perspective of the travel approval process, specifically, which requests are outstanding, which have been fully approved, and which have been denied. A document or other data source is marked as part of the travel approval process by having a specific property attached to it. Thus, any data source can be the source of a travel request.

The travel approval workflow illustrates one of the many advantages of the present invention, "knitting." Documents remain the focus of activity, but the behavior of these documents is affected by the context of their use, and by the states of other documents in the system.

Managing a Complex Process: Hiring Support

Figure 9A:
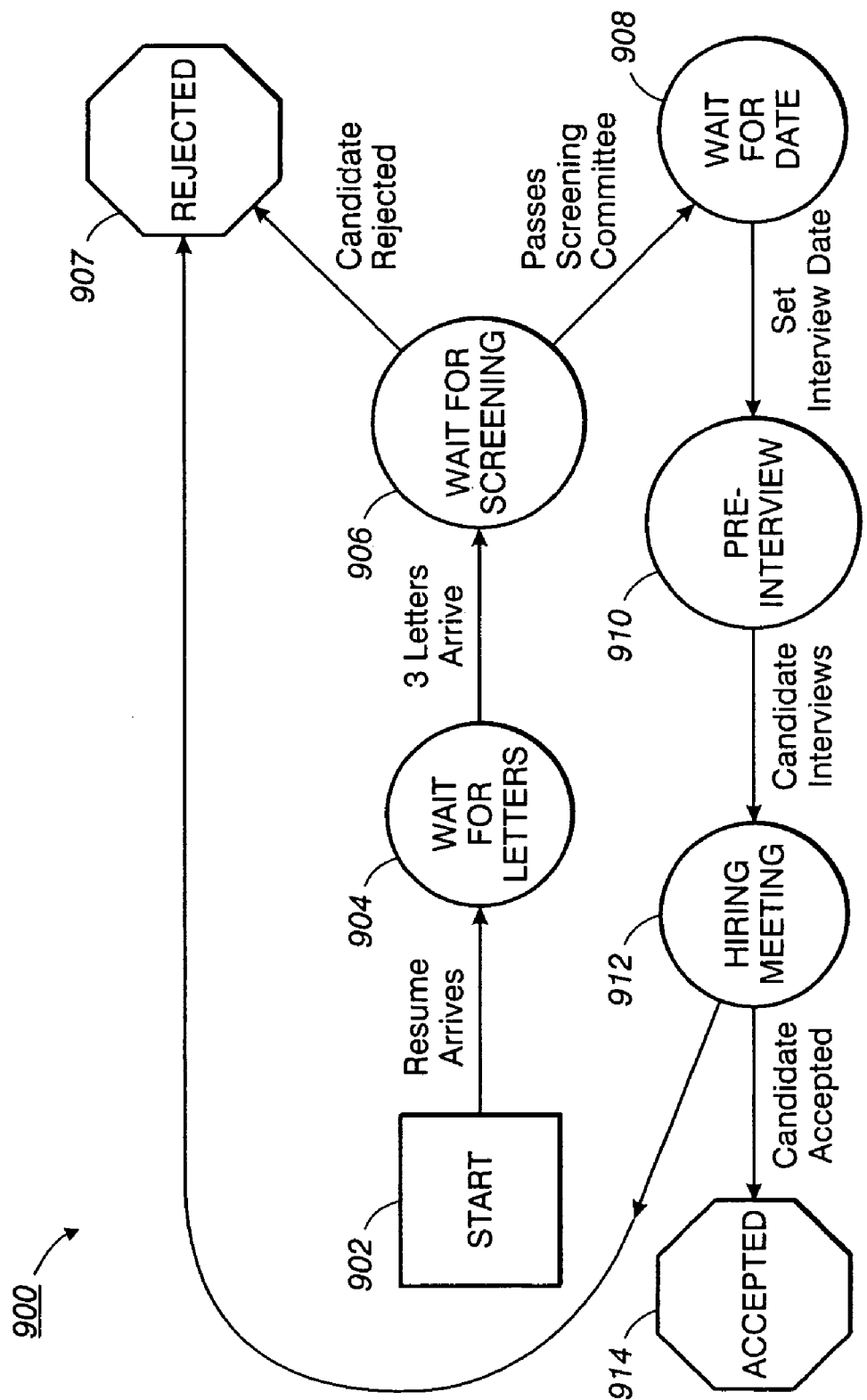
FIG. 9A illustrates the managing of a hiring process 900, performed in accordance with an exemplary embodiment of the present invention.

A block diagram illustrating the control of a hiring process 900, performed in accordance with exemplary embodiments of the present invention, is shown in FIG. 9A. Generally, control begins in block 902 when a candidate submits his application in the form of a resume and a set of supporting documents such as articles and papers. In block 904, upon determining that the application is in order, reference letters are requested for the candidate. Once at least three letters have been received for the candidate, in block 906, the materials are reviewed by a screening committee. It is the job of the screening committee to decide whether or not an interview should be scheduled. The candidate may be rejected at this point, in block 907.

In FIG. 9A, if an interview is approved, in block 908, the candidate is contacted and a date is chosen for the interview through traditional administrative procedures. In block 910, the candidate is brought in for the interview and the process moves into the general voting stage. In block 912, all members of the lab are invited to submit a hiring proxy and vote on the candidate as described below. There are no rigid quantitative rules governing the number of votes that must be cast or what the rejection/acceptance thresholds are. Rather, votes and statistics accumulate for the review of the lab manager who makes the final hiring decision. The candidate may again be rejected, in block 907, or be accepted by the lab for a position, in block 914. An appropriate offer is then extended to the candidate.

Figure 9B:
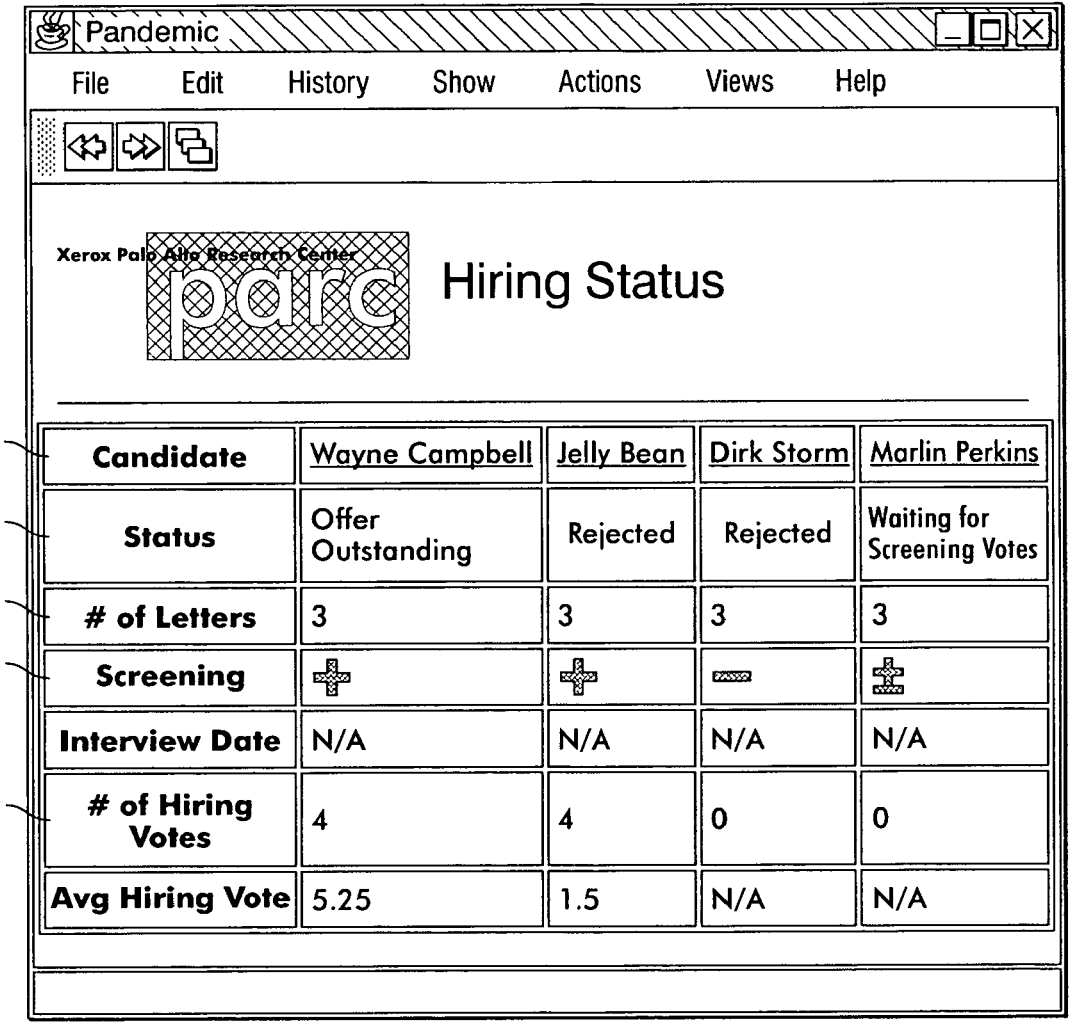
FIG. 9B is a screen display of a hiring status document 920, created in accordance with an exemplary embodiment of the present invention.

FIG. 9B is a screen display of a hiring status document 920 representing the control of managing a hiring process, created in accordance with an exemplary embodiment of the present invention. Users interact with a number of different document types throughout the hiring process. Some of these documents exist on a per-candidate basis and some are shared. One shared document is the hiring status document 920 which contains a live up-to-date summary of the status of all of the candidates 922 in the system. A user, using any tool that understands HTML content, can open status document 920 and be appraised of the status 924 of any candidate in the process. For example, in FIG. 9B, Wayne Cambell has an offer outstanding, while Marlin Perkins is waiting for the screening of votes, in block 906 of FIG. 9A. In document 920, users can view the number of candidate letters 926, view supporting documents, and see compilations of both screening 928 and hiring votes 930 that have been cast.

In FIG. 9B, the status document 920 serves as the mechanism for adding new candidates to the system. A candidate is entered into the hiring process by dragging a link to their resume onto the hiring status document. In particular, a bit provider associated with the hiring status document is configured to interpret the "drop" as meaning a new candidate has been entered into the system. The bit provider then creates a new document containing the resume and updates itself to store information indicating that the new candidate has been entered. This again represents a departure from traditional workflow. Resume documents can be composed in any application and saved in any format. This is especially useful in the hiring process where resumes and letters arrive in a number of different forms including PostScript, simple ASCII, and TIFF images from scanned paper documents.

Upon dragging a resume onto the status document 920, a new candidate document is created. This document serves at least three functions. First, it contains HTML content that gives a detailed view of a candidate's status. The content is similar to that given in the hiring status document, but provides greater detail. The candidate document also functions as the mechanism for adding reference letters and supporting documents for a candidate. When users drag documents onto a candidate document, they are presented with a choice of what type of document is being dropped (letter or supporting document); the system records their choice.

In FIG. 9B, transitions between states in the hiring process take place automatically and user intervention is not required; upon dropping the third reference letter onto a candidate, for instance, the candidate's status is automatically changed from "waiting for letters" to "requiring screening decision."

Finally, the candidate document is used to cast both screening and hiring votes in the system. Preferably, a vote is not just a simple yes/no or a number. Rather, votes have a quantitative portion plus a related document called the proxy. This gives users considerably more flexibility to express what they are thinking and why they voted the way they did. To cast a vote for either screening or hiring, users compose their proxy however they desire and then drag this document onto the candidate. At this point, the user is presented with a small GUI to allow him to enter the quantitative portion of the vote. In the case of a screening vote, the quantitative portion is a simple yes or no. In the case of a hiring vote, candidates are judged on a scale, for instance, from 1 to 7.

In practice, hiring votes are often cast in a number of ways. Roughly half the people in the lab attend a formal hiring meeting to discuss the candidate, some people send in e-mail proxies, while others leave voice mail proxies. Due to its flexibility, exemplary systems constructed according to the present invention accommodate proxies in all of these forms. E-mail and voice mail are easy turned into documents and attached to the candidate document using similar techniques as described above. That is, properties can be attached to e-mail and voice mail files so the files are treated by the document management system as a hiring document. Dropping an e-mail or voice mail file onto the hiring document causes the document to be updated with a new HTML link to the file, and the preferably categorized where appropriate (e.g., as a personal opinion of the candidate). Moreover, using digital video, it becomes possible to record the entire hiring meeting and break it into different documents, each containing an individual's proxy.

Because the document management system implements a set of coordinated properties, described in greater detail below, the user is provided with as coherent an experience as possible. It is for this reason that HTML is the preferable format for the overall status and candidate documents. The hyperlinking in HTML makes it easy for users to smoothly move from the overall status to a single candidate's status and from there to one of the candidate's letters or proxies.

Similar to the travel approval process, the functionality of hiring process control is divided across a number of active properties. In particular, the functionality for the status document 920 is provided by a "HiringStatus" bit provider which both provides up-to-date status for all of the candidates and creates new candidate documents given a resume.

At least a portion of the logic for the hiring process is situated in the "Candidate" bit provider. Like the HiringStatus bit provider, the Candidate bit provider is configured to produce HTML content describing the candidate's status. The Candidate bit provider also understands how to receive supporting documents, reference letters and both screening and hiring votes. To do these things, the Candidate bit provider is configured to recognize the various states of the hiring process and how and when transitions take place. For example, this property knows that if a candidate is in the "waiting for letters" state and has a third letter dropped on it, it should advance to the "requiring screening decision" state.

Finally, a "RelatedDocument" property which gives a document the ability to refer to another relevant document is provided. This property is added to every supporting document, reference letter and proxy vote, and configures it to point at the relevant candidate document. In this way, users can quickly jump across linked clusters of related documents.

Documents that Carry their Interfaces

In the current world, specialized forms of content are operated on by specialized interfaces The phonebook of a cellular phone can be updated by specialized software that is sold with the phone. The corporate travel approval process uses a set of forms that represent the steps and signatures required for the process. These specialized applications exist because the data they operate on are not general-purpose, free-form documents. Rather, these documents have restrictions on them by virtue of the semantics of the applications in which they are used. The applications for these data present specialized interfaces which reflect these restrictions. By moving to the lowest common denominator of the document a certain power is gained, including the reuse of existing tools and leverage of existing knowledge. At the same time, the application-specific support, which makes specific tools valuable, is lost. Thus, there is a tension between the desire for generality and the need for application-specific knowledge to be involved in the editing of these documents.

One solution to this problem, provided in accordance with exemplary embodiments of the present invention, uses the properties provided by the document management system to allow documents to carry active behavior and portions of their own user interfaces. In essence, "atoms" of application code are isolated. Rather than existing solely in a centralized application, these atoms travel with the documents to which they are attached.

A number of conventions have been established by which applications used with document management systems constructed according to the present invention have portions of their behavior and interfaces dynamically loaded from the documents on which they operate. To this end, three classes of document behaviors are defined: actions, views and components.

Actions are argumentless commands that documents can be given. The actions are free to do whatever computation and produce whatever side effects they desire, but provide no return result. Actions provide a way for documents to export simple operations. As examples, the kernel document has an action to flush its internal caches, the people document has an action to open a window on a display screen for composing e-mail to the person, and the camera document has actions to adjust the color, size and timestamps on the image output by the camera.

Views are like actions in that they are simple argumentless commands, but differ in that they return another document as the result of their execution. Views provide an extensible way for documents to point to or themselves produce other documents. As an example, people documents have views that both return the resume and homepage of the person.

The last class of behavior extension is the component which, when evaluated, returns a user interface ("UI") component to help display some aspect of the document's state. Component extensions provide the ability to extend the UI beyond the chosen rendition of the document's content type. The kernel document, for example, has a component extension which returns a progress bar widget which shows how full the system's internal caches are.

Document management systems constructed according to the present invention provide a means to programmatically discover and access the extensions that a document is offering. To demonstrate the use of this, a general purpose document viewer/editor is used which introspects the displayed document and makes the extensions available. Actions are displayed both in a menu named "Action" and on a tool bar. Selecting an action causes it to be executed. View extensions are put in a menu called "View," and selecting the view causes its execution and the resulting document to be viewed. Component extensions are executed and the resulting widgets are placed in a status bar at the bottom of the viewer. See Figure X. In this way, a new point in the spectrum between general-purpose and domain-specific applications is populated. The document viewer is general purpose in that it is free of application specific semantics and can view many different content types, yet it offers some application specific functionality via action, view and component extensions.

CONCLUSION

Methods and systems implemented according to exemplary embodiments of the present invention allow users to access many physical and virtual entities through the familiar document metaphor, including devices, people, processes, and abstract structures. An exemplary document management system, constructed in accordance with the present invention, provides a way to represent these entities as documents. Further, the system presents these documents in such a way that they can be used by existing applications, including tools that read and write to the data sources in the various repositories. Thus, users interact via a well understood model and enjoy features such as searching and indexing over things traditionally missing these affordances.

A document management system constructed according to the present invention uses a holistic approach to document management. The system is extensible in how it exposes underlying content, and in how it makes this content available to applications. The resulting multiplicity, the ability to represent nearly anything as a document for almost any application, is a key source of power in the system. Likewise, document management systems constructed in accordance with the present invention have the ability to dynamically create content based on the state of the world and the context of the use of the document. This ability to take multiple information sources and knit them together based on context allows isolated sets of documents to be merged into a coherent whole.

The above embodiments demonstrate the benefits of using the well-known document metaphor to simplify common tasks. An additional benefit arises when these special documents are part of the user's regular document space. That is, these documents enjoy all of the usual benefits of documents in the system: they can be indexed and searchable, organized, clustered and viewed using the latest algorithms and tools. For example, the user can use the FileManager function of Microsoft® Windows 2000® to create folders of documents representing people he works with on a daily basis. Writing to these document causes a message to be sent to these via some preferred channel. The user can then "grep" or otherwise search for strings in a set of machine documents that indicate some failure or problem condition. The user can index the phonebook in a cellular telephone so that searches on the name of a person stored therein cause the document to be returned in queries like any other document.

It should be understood that the particular embodiments described above are only illustrative of the principles of the present invention, and various modifications could be made by those skilled in the art without departing from the scope and spirit of the invention. Thus, the scope of the present invention is limited only to the extent of the claims that follow.

What is claimed is:

1. A computer document management system for representing an entity as a document using a data source having associated properties and content information related to the entity, the system comprising:
    a bit provider configured to:
        i) identify the data source as having the associated properties independent of a specific user request associating the associated properties and the data source;
        ii) retrieve the content information from the identified data source;
        iii) provide the retrieved content information as at least a portion of the document;
further wherein at least one of said properties is an active property incorporating executable code that affects the behavior of the document within the document management system; and further comprising:
    an application interface in communication with the bit provider, the application interface configured to provide the document to an application, the bit provider further configured to:
        iv) receive additional content information from the application via the application interface; and
        v) send the additional content information to the entity via a communications path in order to modify the document representing said entity.

2. The system of claim 1 wherein the entity is a task.
3. The system of claim 1 wherein the entity is a person.
4. The system of claim 1 wherein the entity is an object.
5. The system of claim 1 wherein the entity is a device.
6. The system of claim 1 wherein the data source is a document.
7. The system of claim 1 wherein the data source is a device.
8. The method of claim 7 wherein the device is a phone.
9. The method of claim 7 wherein the device is a printer.
10. The method of claim 7 wherein the device is a camera.

* * * * *